United States Patent
Dey et al.

(10) Patent No.: US 11,360,821 B1
(45) Date of Patent: Jun. 14, 2022

(54) SYSTEMS AND METHODS FOR RESOURCE UTILIZATION CONTROL

(71) Applicant: Ent. Services Development Corporation LP, Houston, TX (US)

(72) Inventors: Srijani Dey, John's Creek, GA (US); Soumendra Kumar Mishra, Bangalore (IN)

(73) Assignee: Ent. Services Development Corporation LP, Houston, TX (US)

(*) Notice: Subject to any disclaimer, the term of this patent is extended or adjusted under 35 U.S.C. 154(b) by 102 days.

(21) Appl. No.: 16/875,360

(22) Filed: May 15, 2020

Related U.S. Application Data

(60) Provisional application No. 62/849,477, filed on May 17, 2019.

(51) Int. Cl.
  *G06F 9/50* (2006.01)
  *G06F 9/54* (2006.01)

(52) U.S. Cl.
  CPC ............ *G06F 9/505* (2013.01); *G06F 9/5072* (2013.01); *G06F 9/5077* (2013.01); *G06F 9/542* (2013.01); *G06F 2209/5013* (2013.01)

(58) Field of Classification Search
  CPC ....................................................... G06F 9/505
  See application file for complete search history.

(56) References Cited

U.S. PATENT DOCUMENTS

| | | | |
|---|---|---|---|
| 2015/0178135 A1* | 6/2015 | Wang | H04L 45/021 718/104 |
| 2016/0019090 A1* | 1/2016 | Kuromatsu | G06F 9/5038 718/102 |
| 2019/0132353 A1* | 5/2019 | Rodniansky | H04L 63/0227 |

* cited by examiner

*Primary Examiner* — Charlie Sun
(74) *Attorney, Agent, or Firm* — Polsinelli PC

(57) ABSTRACT

Various embodiments of the present technology can include systems, methods, and non-transitory computer readable media configured to receive request information associated with a first request. The request information comprises user information associated with a first user. A first usage threshold associated with the first user is determined based on the user information. A determination is made that the first request has exceeded the first usage threshold. The first request is automatically terminated based on the determination that the first request has exceeded the first usage threshold.

19 Claims, 6 Drawing Sheets

SYSTEMS AND METHODS FOR RESOURCE UTILIZATION CONTROL

CROSS-REFERENCE TO RELATED APPLICATIONS

The present application claims the benefit of U.S. Provisional Application No. 62/849,477 filed May 17, 2019 and entitled "SYSTEMS AND METHODS FOR RESOURCE UTILIZATION CONTROL," which is hereby incorporated by reference herein in its entirety.

FIELD OF THE INVENTION

The present technology relates to the field of computer resource management and, in particular, optimization of cloud computing resources and related requests.

BACKGROUND

The use of cloud computing services is increasing. Various cloud computing services that provide infrastructure, platforms, applications, and other services are available today. In one example, business and research entities can utilize the cloud computing services to perform data analysis, trend analytics, business index reporting, or the like. cloud computing resource

SUMMARY

Various embodiments of the present technology can include systems, methods, and non-transitory computer readable media configured to receive request information associated with a first request. The request information comprises user information associated with a first user. A first usage threshold associated with the first user is determined based on the user information. A determination is made that the first request has exceeded the first usage threshold. The first request is automatically terminated based on the determination that the first request has exceeded the first usage threshold.

In another embodiment, the first usage threshold is adjusted based on the determination that the first request has exceeded the first usage threshold.

In an embodiment, the first user is a member of a first group of users and the first group of users is associated with the first usage threshold.

In an embodiment, a second usage threshold associated with a second group of users is determined. The first user is assigned to the second group of users. The first usage threshold associated with the first user is adjusted to the second usage threshold.

In an embodiment, a notification of termination of the first request is sent to the first user.

In an embodiment, a recommendation for modifying the first request is generated based on the determination that the first request has exceeded the first usage threshold.

In an embodiment, the recommendation is applied to the first request to generate a modified first request. The modified first request is automatically submitted for execution.

In an embodiment, a second request is received from a queue of uninitiated requests. The second request for execution can be automatically submitted while the first request is automatically terminating.

In an embodiment, the request identifying information associated with the first request is determined. Parameters are generated based on the request identifying information.

An automation to terminate the first request is invoked with the parameters. The automation can execute in parallel to the first request.

In an embodiment, the first usage threshold relates to cloud computing resource usage.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

Figure 1:
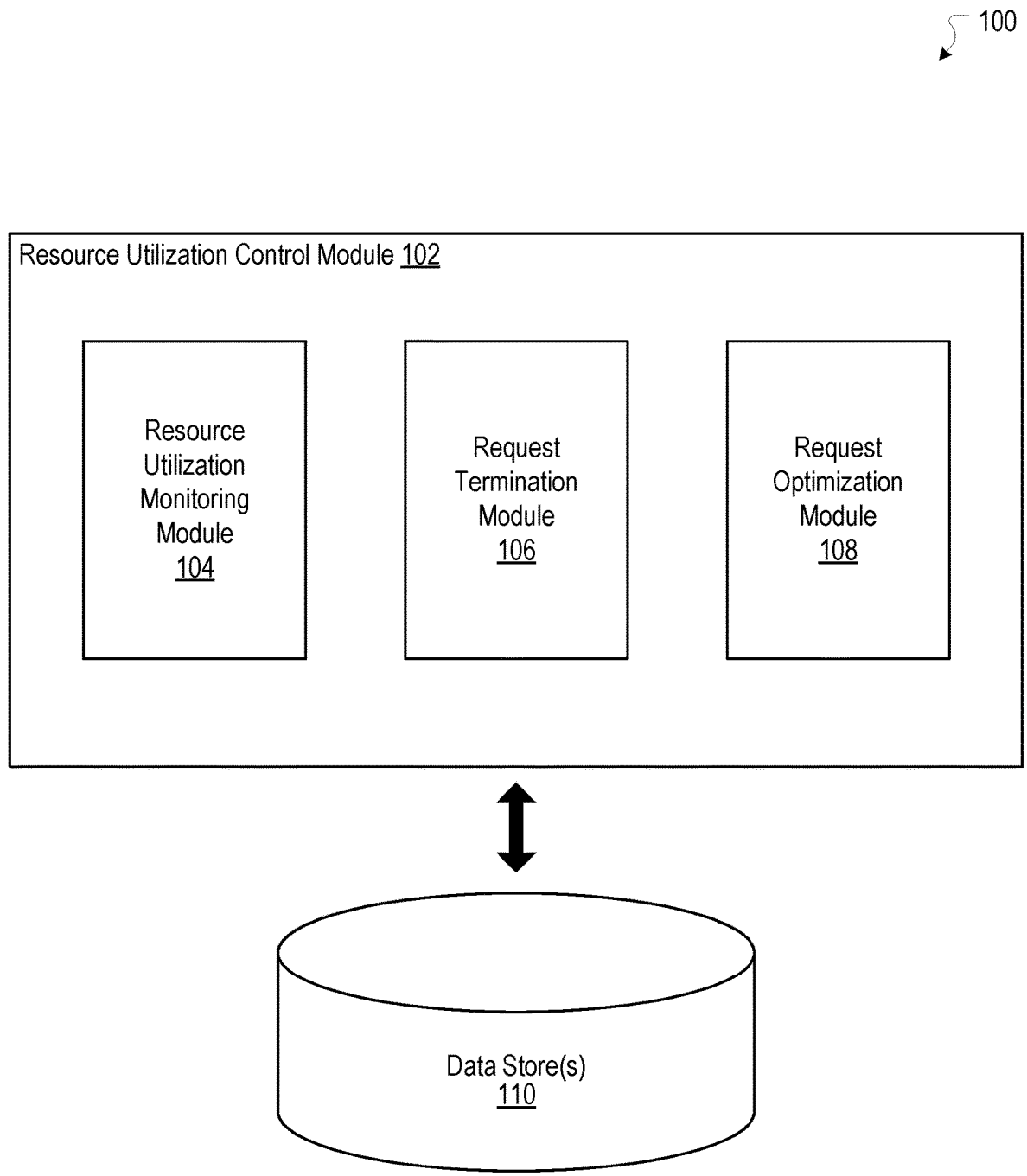
FIG. 1 illustrates an example system including a resource utilization control module according to an embodiment of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Automated Resource Utilization Control

The use of cloud computing services is increasing. Various cloud computing services that provide infrastructure, platforms, applications, and other services are available today. As just one example, business entities can utilize the cloud computing services to perform data analysis, trend analytics, business index reporting, or the like. The cloud computing services provide attractive computing power and scalability. However, usage of cloud computing resources associated with cloud computing services can be costly, and excessive use can result in prohibitive expense for a user.

One example of excessive use relates to a "runaway request" in a service that does not have timeouts/appropriate utilization governance. As used herein, a request can be a query (e.g., a database query), command, workload, or any other type of instructions provided to a computing system (e.g., a cloud computing service) for execution. A runaway request is a request whose execution time takes longer than an expected time to complete the request. As mentioned, running a request against a data store may take a very long time. A runaway request, without timely intervention, can lead to an inordinate amount of cloud computing resources used for the runaway request without providing desired results at the expected cost. Additionally, a runaway request submitted by an analyst in a group of analysts may tie up a disproportionate amount of cloud computing resources and, where a set amount of cloud computing resources are available to the group, may prevent other analysts in the group from submitting higher priority requests that also need to be timely executed. Often, a runaway request can be a result of poorly formulating an expression (e.g., poorly formed syntax) of the request. Such conventional approaches pose these problems and other problems that specifically arise in the realm of computer technology and other related technologies.

An improved approach rooted in computer technology overcomes such problems. Based on computer technology, the present technology provides improved techniques for optimization of cloud computing resources. In some embodiments, cloud computing resource usage for each request is monitored. The cloud computing resource usage may be monitored with a separate process, a separate thread of a process, a cloud service/tool, etc. The monitoring can be performed in real-time or near real-time in parallel with execution of the request without affecting execution of the request. When a request is determined to use an inordinate amount of cloud computing resources, the request can be terminated so that cloud computing resources used by the request can be allocated to a different request. In some embodiments, a request can be determined to use, or have used, an inordinate amount of cloud computing resource based on comparison of such usage with one or more resource usage thresholds. The resource usage thresholds can be defined based on a certain amount of resource usage (e.g., memory space, processing power, etc.) or a certain duration of resource usage (e.g., over 10 minutes, 3 hours, 1.5 days, etc.). Groups of users can be associated with usage resource thresholds that correspond to selected, acceptable levels of resource usage. For example, a group of users can be associated with a certain resource usage threshold that corresponds to an acceptable level of resource usage (e.g., 10 minutes time and/or 20 megabytes of memory), and each user in the group will enjoy the acceptable level of resource usage. A group of users can correspond to users that have a common role, responsibility, authority, duty, or the like. Examples of groups can include, for example, data readers, power users, elite users, data scientists, administrators, junior employees, senior employees, or the like. For example, a data reader may be associated with a threshold usage duration of 15 minutes while, as another example, a power user may be associated with a threshold usage duration of an hour. The resource usage thresholds can define an acceptable level of duration or amount of cloud computing resource usage before the usage is terminated. In some embodiments, a user may be individually associated with a resource usage threshold without regard to possible association with or membership in a group. The resource usage thresholds associated with users or groups of users can be reflected in one or more lookup tables.

Identifying information of a user who submitted, or otherwise is associated with, a request can be maintained. Based on user identifying information associated with a request, a resource usage threshold for the user can be determined. Active requests and their running times can be monitored and compared against an associated resource usage threshold determined for the user. When the resource usage threshold is satisfied (e.g., met or exceeded), the request is determined to have expended excessive cloud computing resources and accordingly can be automatically terminated. The termination of the request releases cloud computing resources so that the cloud computing resources can be allocated and used by another request. In some embodiments, a user associated with the terminated request can be provided a notification. The notification may include an identification of the request, or a portion of the request. The notification can include recommendations on how to modify the request such that execution of the request, once modified, can be completed within the applicable resource usage threshold. In some embodiments, the notification may be provided to a request administrator so that the request administrator may promote or demote access privileges of the user associated with the terminated request. The promotion or demotion may associate a new resource usage threshold with the user. The present technology can be implemented in various computing environments, including computing environments having multiple cloud computing resources. Although references to cloud computing resources are used herein, the present technology applies equally to computing resources that are not cloud-based.

FIG. 1 illustrates an example system 100 including a resource utilization control module 102 according to an embodiment of the present technology. The resource utilization control module 102 can be configured to monitor usage of cloud computing resources by a request. Based on the usage of the cloud computing resources, the resource utilization control module 102 may determine whether the usage is acceptable, or excessive or otherwise undesirable. Based on the determination that the usage is undesirable, the resource utilization control module 102 may terminate the request, thereby causing release of cloud computing resources used by the request. The resource utilization control module 102 can supervise the release of cloud computing resources during and after the termination of the request, and prepare use, or reuse, of the cloud computing resources by another request. In some embodiments, the resource utilization control module 102 can maintain a list of pending requests, prioritize the pending requests based on importance or priority associated with the pending requests, and submit for execution a new request after or near termination of a previous request. In some embodiments, a new request may start to execute while a portion of cloud computing resources used by a terminating request is still getting released. The resource utilization control module 102 may maintain records reflecting various information about a particular request, such as how often the request has been terminated and a user who submitted the request. Additionally, the resource utilization control module 102 can provide notifications about termination of a request to a user associated with the request, which can include recommendations on how to modify the request to avoid excessive usage of cloud computing resources in the future. The resource utilization control module 102 can cause another request to be submitted for execution after or during termination of a previous request.

As shown in FIG. 1, the resource utilization control module 102 can include a resource utilization monitoring module 104, a request termination module 106, and a request optimization model 108. It should be noted that the components shown in this figure and all figures herein are exemplary only, and other implementations may include additional, fewer, integrated or different components. Some components may not be shown so as not to obscure relevant details.

In some embodiments, the various modules and/or applications described herein can be implemented, in part or in whole, as software, platform, hardware, or any combination thereof. In general, a module and/or an application, as discussed herein, can be associated with software, platform, hardware, or any combination thereof. In some implementations, one or more functions, tasks, and/or operations of modules and/or applications can be carried out or performed by software routines, software processes, hardware, and/or any combination thereof. In some cases, the various modules and/or applications described herein can be implemented, in part or in whole, as software running on one or more computing devices or systems, such as on a server or a user or client computing device. For example, one or more modules and/or applications, or at least a portion thereof, can be implemented using one or more computing devices or systems that include one or more services, such as services for transforming data and services for reporting data. The one or more modules can be implemented on network servers or cloud servers. It should be understood that there can be many variations or other possibilities.

As shown in FIG. 1, resource utilization control module 102 can be configured to communicate with a data store 110. The data store 110 can be configured to store and maintain various types of data to facilitate the functionality of the resource utilization control module 102. For example, the data store 110 may store and maintain information about users and their associated privileges relating to submission of requests and use of cloud computing resources. In some embodiments, the associated privileges can correspond to various roles of users, such as data reader, elite user, power user, analyst, administrator, operational user, or other roles. The privileges may be associated with specified acceptable limits of cloud computing resource usage, which can be reflected through or represented as resource usage threshold times. In some embodiments, the data store 110 may store and maintain information about the users and their associated privileges as lookup tables. In some embodiments, the lookup tables can be loaded into a memory or other caching structure, relatively faster than data store 110, that resides in and/or is used by the resource utilization control module 102. The relatively faster memory can reduce latency associated with accessing and using the lookup tables. In some embodiments, the resource utilization control module 102 may periodically refresh the lookup table from the data store 110. For example, based on user identifying information of a user, the data store 110 can supply a resource usage threshold time for the user. In some cases, the data store 110 may store and maintain logs relating to cloud computing resource usage including submitted requests, identifying information about users who submit requests, a role associated with the request-submitting user, timestamps for request submissions, execution times of submitted requests, etc.

In some embodiments, the data store 110 may store key-value pairs that are parts of various rules that govern and control the resource utilization control module 102. One or more rules can perform checks on input data provided to the resource utilization monitoring module 104, the request termination module 106, the request optimization module 108, or the like. For example, assume that a first rule can check for existence of a data field that represents an error at the last data field of an input file (e.g. input data). Further assume that the error may be a difference between an expected performance metric and an actual performance metric. When the first rule is applied to the input file, the first rule can determine that the input file does not include data representing the error at the last data field. Upon the determination, the first rule can kill a process that provided the input file. As another example, assume that a second rule can check whether a difference between data in a first data field and data in a second data field equals data in the last data field. When the second rule is applied to the input file, the second rule can determine that the input file has data in the last data field that does not equal a difference between data in the first data field and data in the second data field. Upon the determination, the second rule may log the result of the check into the data store 110. The first and the second rules can be written as machine-readable code.

In some embodiments, the rules can be data-driven rules. Continuing with the above example rules, the logical portion of the first rule that checks for the existence of data in the last data field can be decoupled from a type of data field (e.g., an error between expected and actual metrics) that the first rule checks. For example, the first rule can be decoupled from a data field that represents the error and, instead, coupled with a data field that represents net income (e.g., revenue minus expense). Accordingly, the first rule can be repurposed to check for existence of a data field that represents the net income. Similarly, the logical portion of the second rule can be decoupled from data fields respectively representing the expected performance metric and the actual performance metric and, instead, coupled with data fields respectively representing revenue and expense. As the first rule checks for existence of a data field, the first rule is compatible with the newly coupled data field of net income. Similarly, as the second rule checks for logical equality among data in the data fields, the second rule is also compatible with the newly coupled data fields of revenue and expense. Decoupled data fields and couplable data fields can be stored on the data store 110 as key-value pairs. Based on a key-value pair, the logical portion of a rule can reference a key of the key-value pair and the data store 110 can provide a corresponding value to the rule. In the above examples, the key can be a reference to a location on a database on the data store 110 and the value can be a corresponding data entry stored at the location. In the above examples, the data entry represents a particular data field. Thus, the rules can be repurposed at or during run-time. Such decoupling of a logical portion of a rule and particular data field compatible with the rule can facilitate repurposing of the rule without having to update the whole of the rule. To repurpose an existing rule, a change to the key-value pair in the data store 110 can be sufficient. In some embodiments, if rules generate output results, the output results can also be similarly repurposed based on the key-value pairs. In some embodiments, some or all of the logical portion of a rule can also be decoupled and stored on the data store 110 as a template of the rule. For example, a rule can be repurposed to generate a log of output results instead of terminating a process that provided an input file based on a template of a rule that terminates a process. Accordingly, the template can facilitate generation of an additional rule by instantiating the template.

The resource utilization monitoring module 104 can be configured to access and monitor cloud computing resource usage. The resource utilization monitoring module 104 can cause generation of usage logs that reflect cloud computing resource usage by requests. The resource utilization monitoring module 104 can access request-related information, such as user identifying information (a user identifier) of a user who initiated a request, and perform a search of the data store 110 for an associated resource usage threshold. The resource utilization monitoring module 104 can, based on usage logs and the associated resource usage threshold, determine that a request has reached or exceeded the resource usage threshold. In some embodiments, the resource utilization monitoring module 104 may cause some or all of the usage logs to be stored in the data store 110 for data persistence. In some embodiments, the resource utilization monitoring module 104 may additionally associate some metadata with a user, such as information on how often a particular user submitted terminated requests (e.g., 12 times within last week, 20 times within the last month, etc.), and store the metadata in the data store 110. The information can provide additional insight into how cloud computing resources are used by users. The metadata can, in some cases, be stored as annotations or notes. The features of the resource utilization monitoring module 104 are further described below with reference to FIG. 3.

The request termination module 106 can be configured to automatically terminate a request based on a determination that the request has exceeded an associated resource usage threshold. In an embodiment, for a request submitted by a user, a resource usage threshold associated with the user can be determined. The resource usage threshold may be specific to the user or may be shared by a group in which the user is a member. For example, a user can be a member of a group "Elite User" and the members of the "Elite User" group may share the same resource usage threshold associated with the group. Further, a first group may be associated with a resource usage threshold that is different from a resource usage threshold associated with a second group. For example, the resource usage threshold for the group "Elite User" may be higher (or lower) than a resource usage threshold for a different group, for example, a group "Data Analyst." Some example groups of users can include Data Reader/Data Analyst/Operations Team Member, Elite User/Insight Builder, Power User/Steward, or Data Scientist. When it is determined that a resource usage threshold for a request is exceeded, the request termination module 106 causes the request to be terminated. The request termination module 106 may directly "kill" (or terminate) the request or, in some cases, invoke an automation and pass parameters of the request to the automation such that the request will eventually be terminated. It can take a substantial amount of time (e.g., many seconds) to terminate a request and release cloud computing resources used by the request. In some embodiments, once a request that has reached its associated resource usage threshold has been detected and termination of the request has begun, the resource utilization control module 102 may cause a parallel process to automatically initiate a next request during the request termination, thereby minimizing downtime and maximizing cloud computing resource usage. In some embodiments, the resource utilization control module 102 can maintain a list of pending requests, prioritize the pending requests based on various factors, and automatically submit for execution a next request after or near termination of a previous request. Such factors relating to priority can include, for example, a user in a group having a higher priority than another group (e.g., submitted by an "Elite User" as opposed to a "Data Analyst"), request priority indications (e.g., a request marked with greater importance than another request), request queue placement (e.g., a request placed in queue for execution before another request), etc.

The request optimization module 108 can be configured to provide notifications, suggestions, or recommendations about a request to a user. Based on resource usage associated with a request exceeds an associated resource usage threshold, the request optimization module 108 may provide a notification to a user who submitted the request. The notification can include various information about the request, such as reasons the request was terminated, an amount of cloud computing resources (e.g., CPU, GPU, memory) used by the request, a time duration that the request ran, syntax of the request, etc. The notification also can include a recommendation on how to improve the request. For example, the request optimization module 108 may provide recommendations on how to modify the request so that execution time of the request does not exceed an associated resource usage threshold in future executions. In some embodiments, the request optimization module 108 may actively modify the request and re-submit the request as modified without intervention by a person, such as a user or a system administrator.

In an embodiment, the request optimization module 108 can be configured to detect and determine various scenarios of request termination, including request termination based on excessive resource usage. In some instances, a termination scenario may be a special, one-off instance. For example, a data reader may have written a request and submitted it as part of a proof-of-concept effort. In this scenario, the request optimization module 108 may record termination of the request, but may not take or recommend additional actions. In contrast, if multiple requests submitted by a particular user are consistently terminated, the terminated requests may be recorded, identified, and analyzed to detect a pattern or common characteristic(s) among the requests causing excessive resource usage. Causes of excessive resource usage, or issues, can be various. For example, an issue (e.g., anomaly) may relate to a request that is identical, or substantially similar, to a previously identified request that exceeded a common resource usage threshold. In some embodiments, one or more machine learning models can be trained with training data that associates some or all of various request parameters, syntaxes, resource usages, and/or identified issues. The one or more machine learning models, once trained, can be used to infer whether a given request is likely to exceed the common resource usage threshold. As another example, an issue may relate to a user who submits too many requests that exceed an associated resource usage threshold. In some embodiments, issues can be detected based on whether a specified number of successive requests have exceeded an associated resource usage threshold within a specified period of time. For example, a user who has submitted a threshold number of successive requests that have exceeded an associated resource usage threshold within a certain time period can be identified as an issue.

In an embodiment, if an issue is detected, the request optimization module 108 may give a user guidance as to how to improve future requests. For example, a request may include multiple request clauses with each request clause intended to reduce (e.g., filter) the number of results during execution of the request. The guidance may indicate to the user a particular or revised ordering of the request clauses to cause greater early reduction in the results as compared to a different ordering of the request clauses. Ordering the request clauses in accordance with the guidance in this way may result in improved efficiency in running the request, and may cause resource usage during request execution to fall within a limit designated by an associated resource usage threshold. As just one example, identification of all sales of an item in California on Nov. 14, 2019 can be desired. An example request can include two request clauses: (1) a geographic clause (California); and (2) a date clause (Nov. 14, 2019). If 20% of all U.S. sales in 2019 took place in California, and if 0.5% of sales in 2019 took place on Nov. 14, 2019, guidance provided by the request optimization module 108 may suggest execution of the date clause before execution of the geographic clause to improve efficiency in running the request. Thus, the request optimization module 108 can analyze how data is structured or organized (e.g., partitioned) in a database and proactively offer request rewrite recommendations that would improve efficiency. In some embodiments, when resource usage exceeds a current resource usage threshold, the request optimization module 108 may recommend that a system administrator re-classify a user associated with an issue to a different group associated with a greater resource usage threshold. In some embodiments, the request optimization module 108 may recommend that a system administrator increase a resource usage threshold for a user or associated group of the user. In an embodiment, the system administrator may adjust issue detection thresholds, such as increasing a number of required excessive requests by a user, or modifying a specified time window for detection of the number of required excessive requests, or modifying of a specific data partition that request should utilize for improved performance, to optimize issue detection.

In some embodiments, the resource utilization control module 102 may preemptively recommend a request optimization. For example, the resource utilization control module 102 may determine that a trend in resource utilization, based on monitoring of resources provided by the resource utilization monitoring module 104, indicates that a peak utilization of available computing resources will be reached unless submitted requests are optimized. The resource utilization control module 102 may recommend, using the request optimization module 108, request optimizations for various requests. In some embodiments, requests or users that demand more computing resources can be prioritized in recommendations of request optimizations. As another example, the resource utilization control module 102 may preemptively recommend a request optimization for a request that exhibit use of computing resources over a threshold amount of time. In some embodiments, based on total usage of computing resources by a user, the resource utilization control module 102 may preemptively recommend a request optimization to the user.

In some embodiments, the resource utilization control module 102 can be exposed as or to an application programming interface (API) such that various cloud service tools can interface with the resource utilization control module 102 to utilize role-based cloud resource access and utilization management capabilities of the resource utilization control module 102. For example, various roles, associated resource usage thresholds, and a cloud service tool to integrate with can be provided to the API. By integrating with a cloud service tool via the API, the resource utilization control module 102 can perform some or all of resource utilization monitoring, request termination, and request optimization functions for the cloud service tool. In some embodiments, an engineer may be provided a graphical user interface (GUI) to select one or more cloud service tools to integrate the resource utilization control module 102 with, and the resource utilization control module 102 can be automatically integrated with the one or more cloud service tools.

Figure 2:
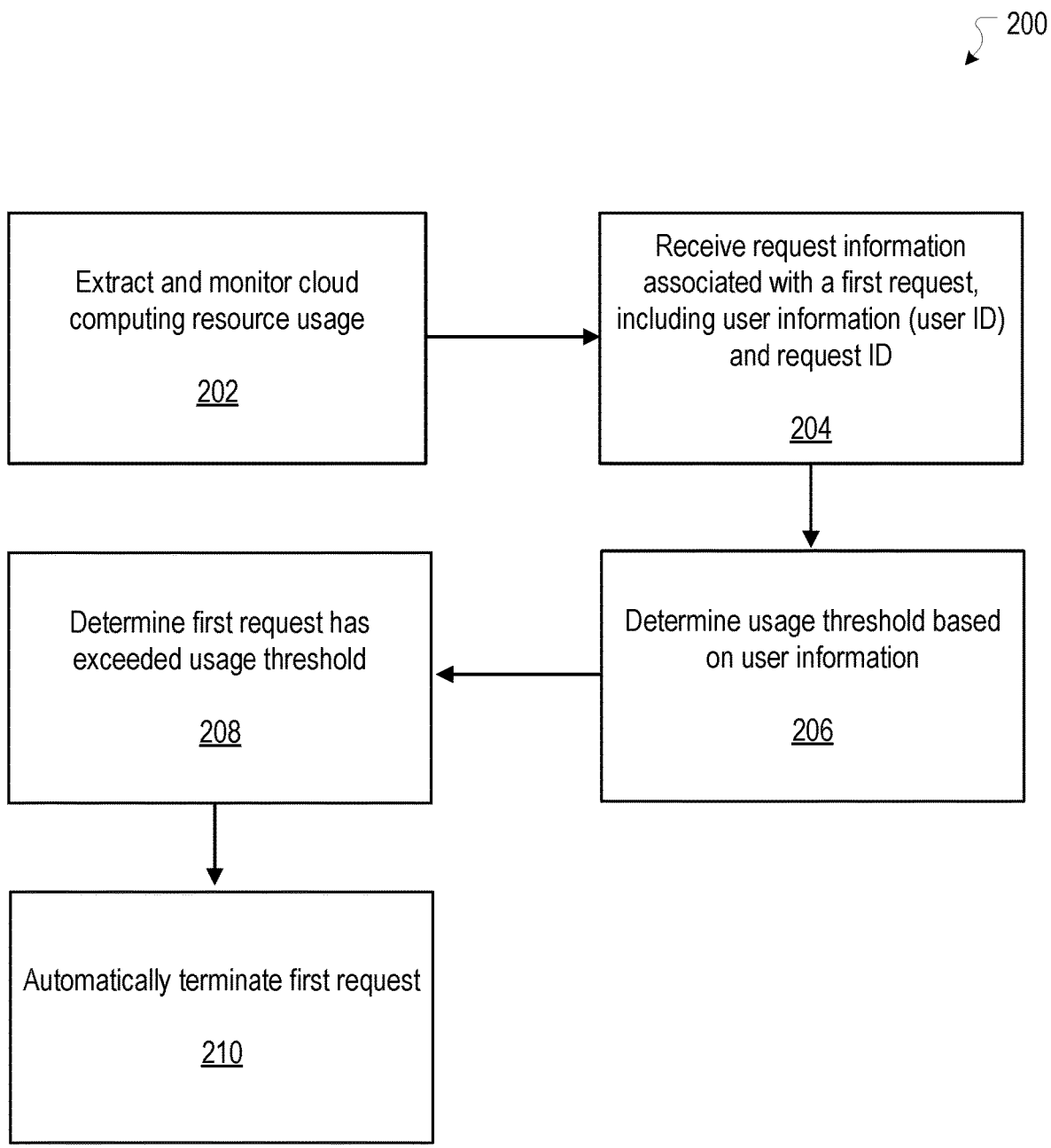
FIG. 2 illustrates an example flow chart associated with automated resource utilization control, according to an embodiment of the present technology.

FIG. 2 illustrates an example flow chart 200 associated with automated resource utilization control, according to an embodiment of the present technology. In some embodiments, the resource utilization control module 102 of FIG. 1 can be implemented to perform all or portions of the example flow chart 200. At block 202, the automated resource utilization control can extract and monitor cloud computing resource usage. Cloud computing resource usage may be, for example, logged at various times or streamed in real-time. The cloud computing resource usage is monitored and analyzed to determine how the cloud computing resources are being utilized. In an embodiment, a separate cloud service, a process, or a thread of a process can read the logs in a parallel manner so that the automated resource utilization control can monitor and analyze cloud computing resource usage without affecting the execution of requests.

At block 204, the automated resource utilization control can receive request information associated with currently running requests. The request information can include user identifying information associated with a user (e.g., user ID), request identifying information (e.g., request ID), request execution time, request priority, and the like.

At block 206, the automated resource utilization control can determine, based on the user information, a resource usage threshold. As mentioned, user identifying information can be associated with a resource usage threshold. In some cases, the resource usage threshold may be associated with a group in which the user is a member. The association of the user and the resource usage threshold may be acquired from, for example, a lookup table.

At block 208, once the resource usage threshold is determined, the automated resource utilization control can determine whether any requests have exceeded their respective resource usage thresholds.

At block 210, the resource utilization control can automatically terminate requests that were determined to exceed their respective resource usage thresholds. In some embodiments, the resource utilization control may monitor utilization of released cloud computing resources associated with the terminated requests during and after the terminations. Additionally, the resource utilization control may report resource utilization health so that a system administrator can take remedial action, as appropriate. It should be understood that there can be many variations or other possibilities.

Figure 3:
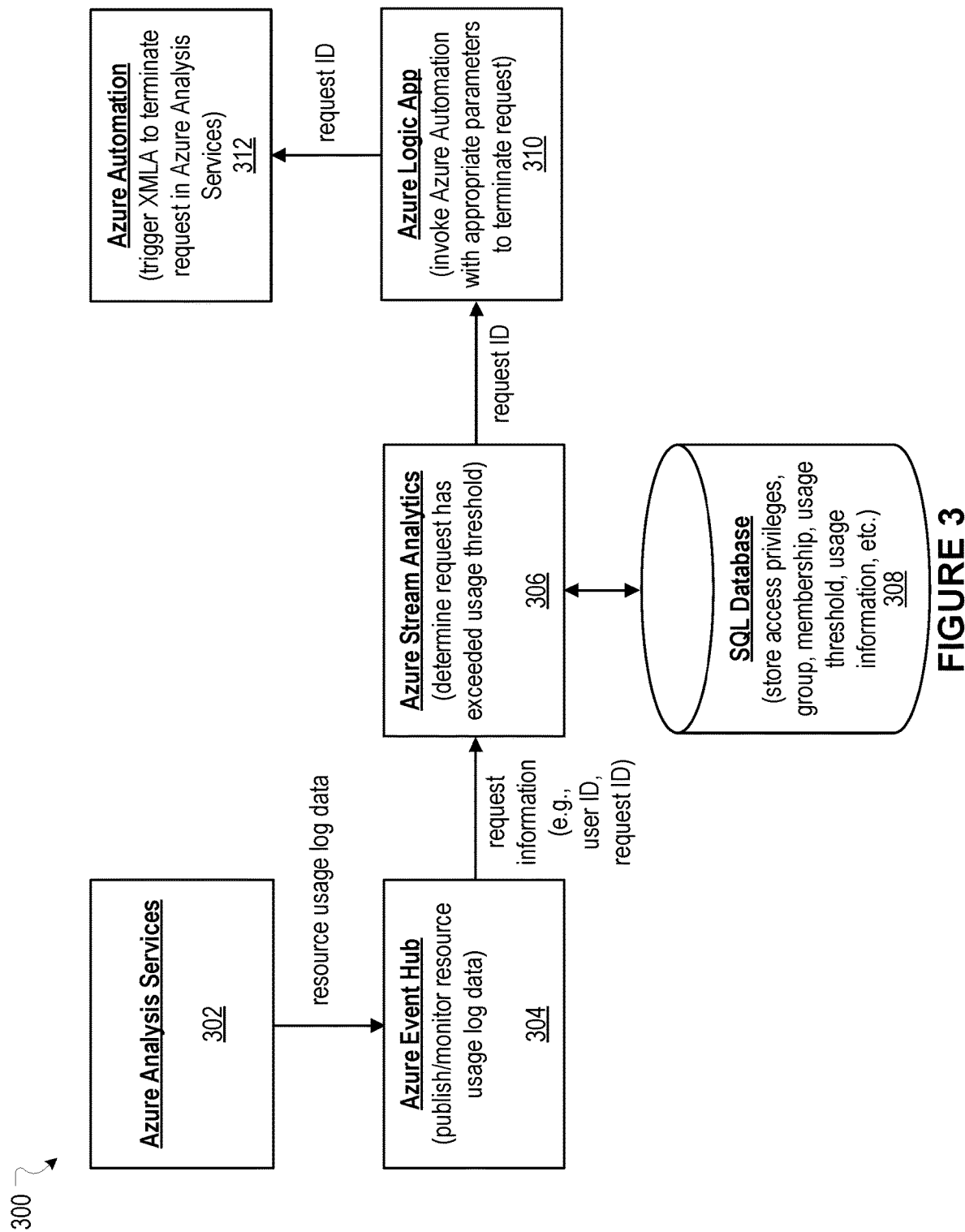
FIG. 3 illustrates an example functional block diagram associated with automated resource utilization control, according to an embodiment of the present technology.

FIG. 3 illustrates an example functional block diagram 300 associated with automated resource utilization control, according to an embodiment of the present technology. In some embodiments, the resource utilization control module 102 of FIG. 1 can be implemented to perform all or some functions of the example functional block diagram 300. The example functional block diagram 300 describes an example implementation of the present technology in an example environment relating to Microsoft® Azure and various components or tools thereof. However, the example environment is discussed herein only to facilitate description of the present technology. The present technology can be implemented in other environments as well. In some embodiments, the present technology can be implemented in the example environment to build an improved system for cloud computing resource optimization. The improved system provides a real-time or near real-time automation that optimizes resource utilization based on classification of requests. The system greatly reduces runaway requests commonly associated with various analysis and reporting activities, such as data analysis, trend analytics, and business index reporting, where runaway requests are found with high frequency.

Azure Analysis Service® 302 can be configured to generate real-time events, which are collected by Azure Event Hub® 304. Azure Analysis Service® 302 is a fully managed platform as a service (PaaS) that provides enterprise-grade data models in a cloud. Azure Event Hub® 304 is a fully managed, real-time data ingestion service that can stream millions of events per second from any source to build dynamic data pipelines. Azure Event Hub® 304, using its ingestion service, collects execution logs from Azure Analysis Service® 302 in real-time. In some embodiments, Azure Event Hub® 304 can perform cloud computing resource utilization and streaming log extraction. Some example parameters provided to Azure Event Hub® for the streaming log extraction can be identifying information of a resource being monitored (e.g., a name of a monitored semantic model), identifying information of a log that Azure Event Hub® should access, request information including user identifying information or request identifying information, or the like. Azure Event Hub® can monitor or publish log data of cloud computing resource usage.

Azure Stream Analytics® 306 can be configured to consume event logs from Azure Event Hub® and analyze the event logs in parallel with request execution. Azure Stream Analytics® 306 is a real-time analytics and complex event-processing engine designed to analyze and process high volumes of fast streaming data from multiple sources simultaneously. In some embodiments, various business rules are embedded into Azure Stream Analytics® 306 to transform the event logs into insights about cloud computing resource usage specific to a user or a request. Azure Stream Analytics® 306 can be configured to access a SQL Database 308 to determine applicable resource usage thresholds for identified users or requests. As mentioned, the resource usage thresholds can be accessed via a lookup table. Then, Azure Stream Analytics® 306 can apply a threshold-based logic (e.g., a business rule) to detect whether a particular request has exceeded its associated resource usage threshold. Azure Stream Analytics® 306 can store detected instances of excessive resource usage into the SQL Database 308 for persistence. Additionally, Azure Stream Analytics® 306 may access the stored instances from the SQL Database 308 to further provide analysis on whether a particular user, a particular request, or both show a pattern of exceeding the associated resource usage threshold. Accordingly, Azure Stream Analytics® 306 can further provide insights relating to the patterns. In some embodiments, Azure Stream Analytics® 306 may access a priority associated with a user or a request and further provide insight on whether the user should be assigned greater or lesser resource usage thresholds. For example, if a user is assigned a membership in a group "Data Analyst" and the user consistently and repeatedly exceeds a resource usage threshold for the group "Data Analyst," an insight suggesting that the user should be promoted to a group "Elite User" with a greater resource usage threshold. As another example, the user may be assigned to a group "Data Reader" which can be associated with lower execution priority for requests submitted by its members, thereby reducing cloud computing resource usage by the requests submitted by the user.

Azure Logic App® 310 can be configured to invoke a request termination procedure. Azure Logic App® 310 is a cloud service that helps schedule, automate, and orchestrate tasks, business processes, and workflows and integrates data, systems, and services across enterprises or organizations. Azure Logic App® 310 can receive request identifying information of a request to be terminated and a name of a server on which the request is currently executing. In some embodiments, Azure Logic App® 310 may additionally receive other information (e.g., user identifying information) associated with the request. Where the request identifying information may not uniquely identify a request, Azure Logic App® 310 may identify the request to be terminated with a combination of identifying information, such as a combination of a user identifying information and the request identifying information. Azure Logic App® 310 can be configured to pass the request identifying information to Azure Automation 312 and pass the request identifying information as parameters so that Azure Automation® 312 can terminate the request.

Azure Automation® 312 can be configured to terminate, kill, cancel, or otherwise abort runaway requests, such as requests whose resource usage exceeds associated resource usage thresholds. Azure Automation® 312 delivers a cloud-based automation and configuration service that provides consistent management across Azure® and non-Azure environments. In some embodiments, Azure Automation® 312 may trigger, or otherwise cause to be executed, an XML for Analysis (XMLA) request in order to initiate logic that stops resource utilization by runaway requests and release memory and other computing resources for other requests. In some embodiments, Docker® or Kubernetes® Containers can be configured to orchestrate monitoring of resource health (e.g., successful release of cloud computing resources, time duration it took to release, etc.) during and after the termination of a runaway request. The monitored resource health may be reported to a system administrator of the resource utilization control. In some embodiments, the monitored resource health may be reported in real-time or near real-time via a user interface, such as a dashboard.

As described in FIG. 1, the resource utilization control module can be exposed as or to an API, and can be integrated with any appropriate cloud service tools.

Figure 4:
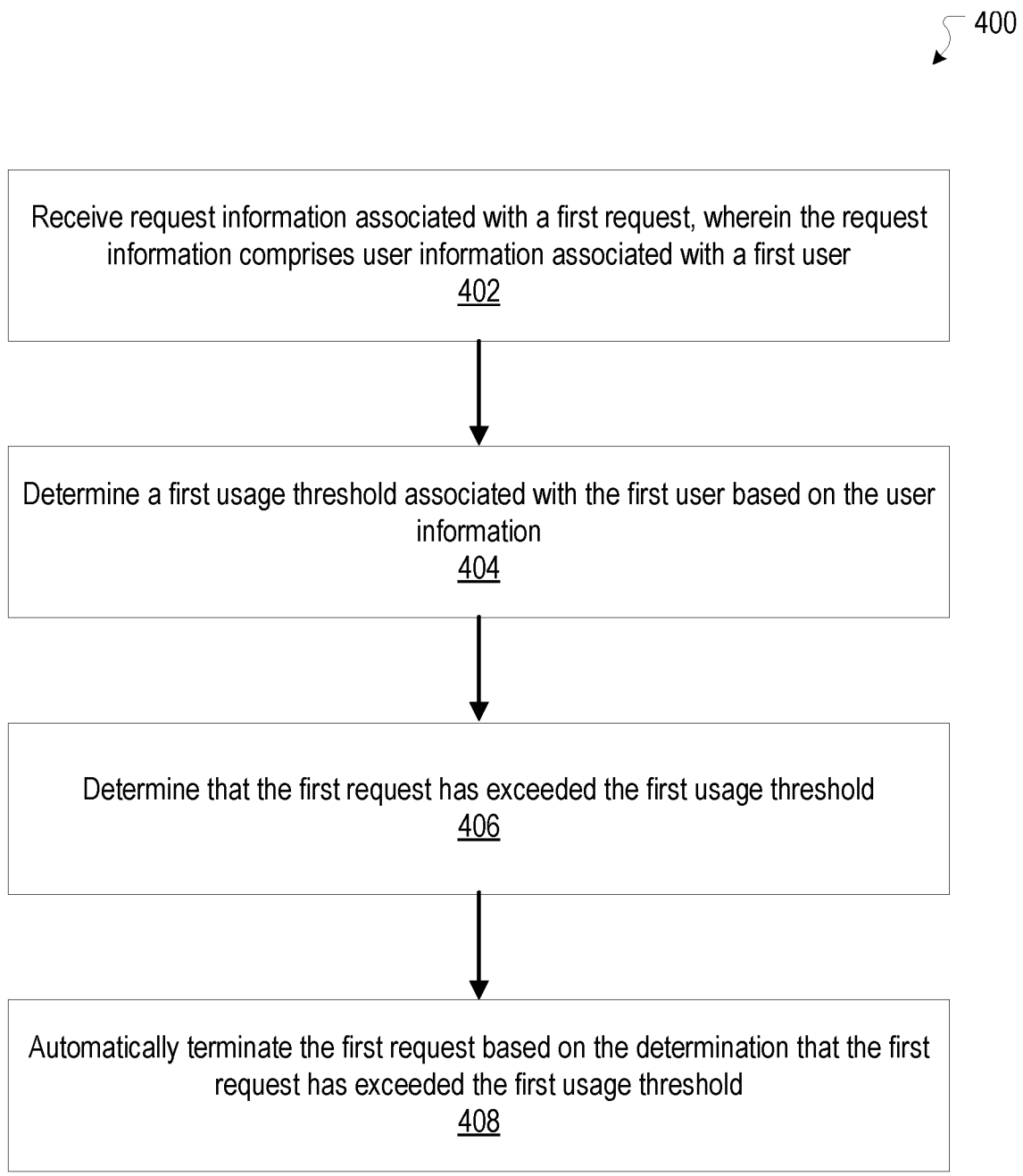
FIG. 4 illustrates an example method according to an embodiment of the present technology.

FIG. 4 illustrates a flowchart of an example method 400 according to some embodiments of the present technology. It should be understood that there can be additional, fewer, or alternative steps performed in similar or alternative orders, or in parallel, based on the various features and embodiments discussed herein unless otherwise stated.

Figure 5:
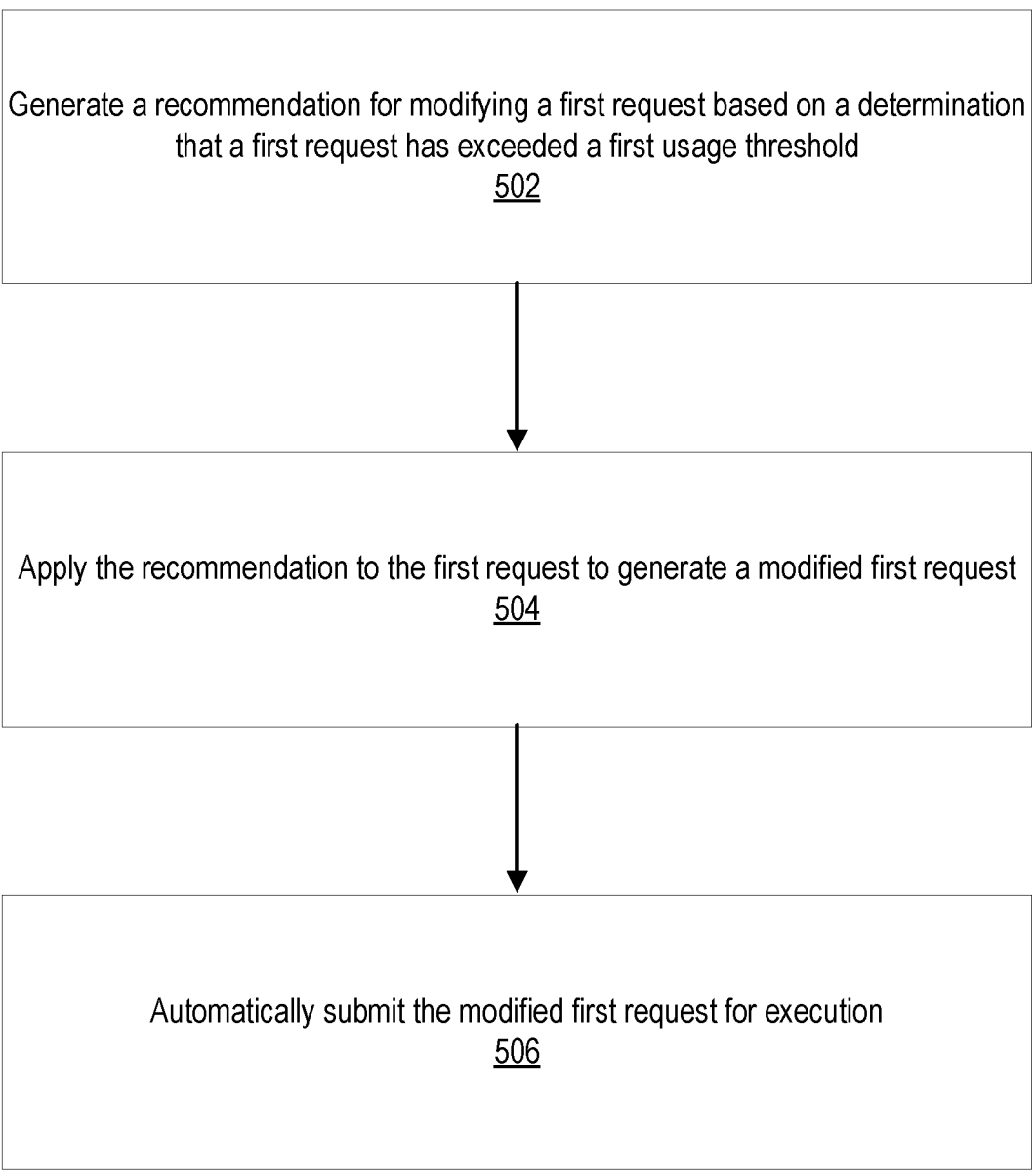
FIG. 5 illustrates an example method according to an embodiment of the present technology.

As shown in FIG. 4, at block 402, the example method 400 can receive request information associated with a first request, wherein the request information comprises user information associated with a first user. At block 404, the example method 400 can determine a first usage threshold associated with the first user based on the user information. At block 406, the example method 400 can determine that the first request has exceeded the first usage threshold. At block 408, the example method 400 can automatically terminate the first request based on the determination that the first request has exceeded the first usage threshold FIG. 5 illustrates a flowchart of an example method 500 according to an embodiment of the present technology. It should be understood that there can be additional, fewer, or alternative steps performed in similar or alternative orders, or in parallel, based on the various features and embodiments discussed herein unless otherwise stated.

As shown in FIG. 5, at block 502, the example method 500 can generate a recommendation for modifying a first request based on a determination that a first request has exceeded a first usage threshold. At block 504, the example method 500 can apply the recommendation to the first request to generate a modified first request. At block 506, the example method 500 can automatically submit the modified first request for execution.

Hardware Implementation

Figure 6:
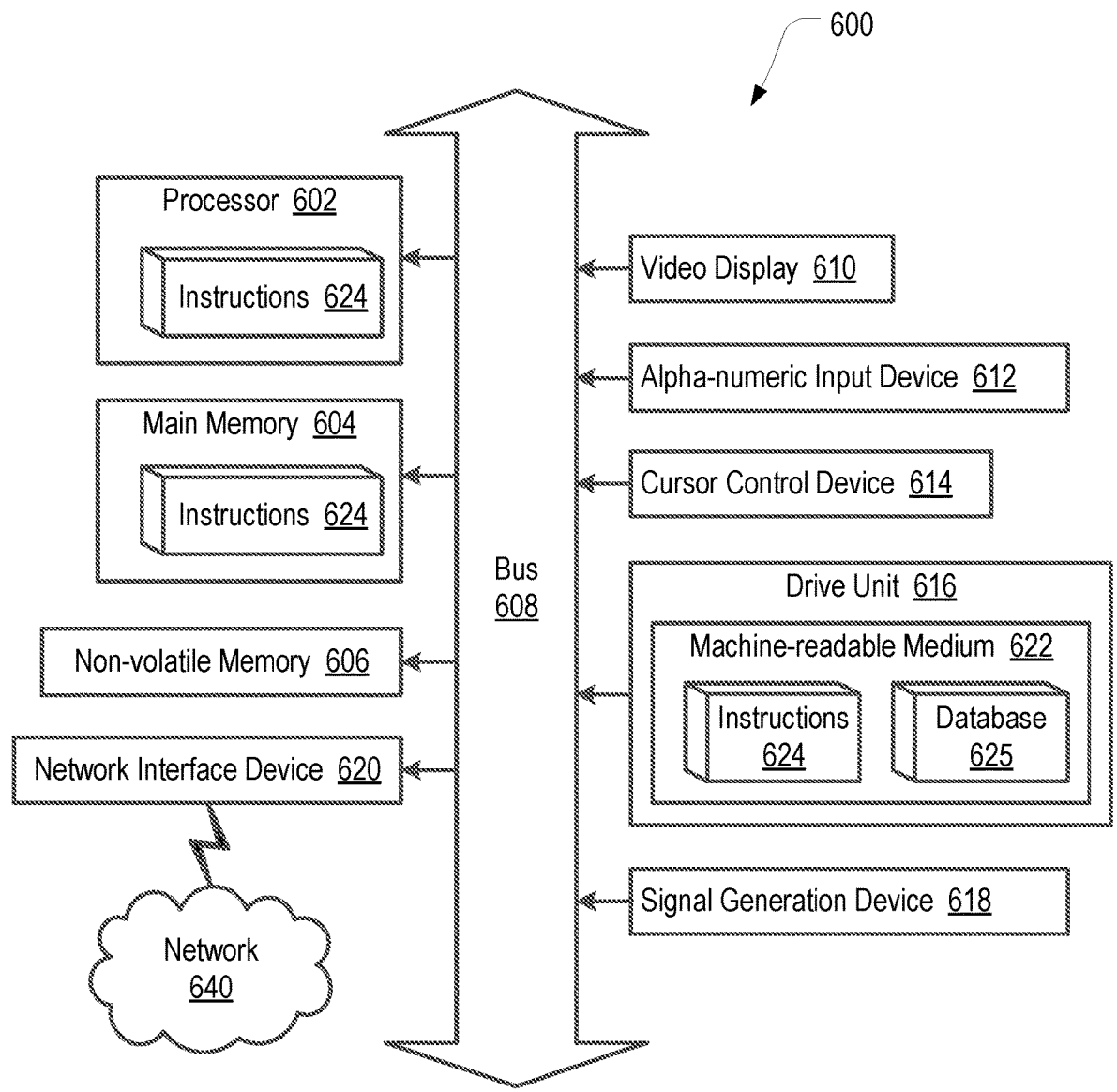
FIG. 6 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 6 illustrates an example of a computer system 600 that may be used to implement one or more of the embodiments described herein according to an embodiment of the invention. The computer system 600 includes sets of instructions 624 for causing the computer system 600 to perform the processes and features discussed herein. The computer system 600 may be connected (e.g., networked) to other machines and/or computer systems. In a networked deployment, the computer system 600 may operate in the capacity of a server or a client machine in a client-server network environment, or as a peer machine in a peer-to-peer (or distributed) network environment.

The computer system 600 includes a processor 602 (e.g., a central processing unit (CPU), a graphics processing unit (GPU), or both), a main memory 604, and a nonvolatile memory 606 (e.g., volatile RAM and non-volatile RAM, respectively), which communicate with each other via a bus 608. In some embodiments, the computer system 600 can be a desktop computer, a laptop computer, personal digital assistant (PDA), or mobile phone, for example. In one embodiment, the computer system 600 also includes a video display 610, an alphanumeric input device 612 (e.g., a keyboard), a cursor control device 614 (e.g., a mouse), a drive unit 616, a signal generation device 618 (e.g., a speaker) and a network interface device 620.

In one embodiment, the video display 610 includes a touch sensitive screen for user input. In one embodiment, the touch sensitive screen is used instead of a keyboard and mouse. The disk drive unit 616 includes a machine-readable medium 622 on which is stored one or more sets of instructions 624 (e.g., software) embodying any one or more of the methodologies or functions described herein. The instructions 624 can also reside, completely or at least partially, within the main memory 604 and/or within the processor 602 during execution thereof by the computer system 600. The instructions 624 can further be transmitted or received over a network 640 via the network interface device 620. In some embodiments, the machine-readable medium 622 also includes a database 625.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 606 may also be a random access memory. The non-volatile memory 606 can be a local device coupled directly to the rest of the components in the computer system 600. A non-volatile memory that is remote from the system, such as a network storage device coupled to any of the computer systems described herein through a network interface such as a modem or Ethernet interface, can also be used.

While the machine-readable medium 622 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

In general, routines executed to implement the embodiments of the invention can be implemented as part of an operating system or a specific application, component, program, object, module or sequence of instructions referred to as "programs" or "applications". For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 600 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", "in various embodiments," or the like means that a particular feature, design, structure, or characteristic described in connection with the embodiment is included in at least one embodiment of the disclosure. The appearances of, for example, the phrases "according to an embodiment", "in one embodiment", "in an embodiment", "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention, both independently and as an overall system, and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computing system, request information associated with a first request, wherein the request information comprises user information associated with a first user;
    determining, by the computing system, a first usage threshold associated with the first user based on the user information;
    determining, by the computing system, that the first request has exceeded the first usage threshold;
    automatically terminating, by the computing system, the first request based on the determination that the first request has exceeded the first usage threshold;
    receiving, by the computing system, a second request from a queue of uninitiated requests; and
    automatically submitting, by the computing system, the second request for execution while the first request is automatically terminating.

2. The computer-implemented method of claim 1, wherein the first usage threshold is adjusted based on the determination that the first request has exceeded the first usage threshold.

3. The computer-implemented method of claim 1, wherein the first user is a member of a first group of users, and wherein the first group of users is associated with the first usage threshold.

4. The computer-implemented method of claim 3, further comprising:
    determining, by the computing system, a second usage threshold associated with a second group of users; and
    assigning, by the computing system, the first user to the second group of users, wherein the first usage threshold associated with the first user is adjusted to the second usage threshold.

5. The computer-implemented method of claim 1, further comprising:
    sending, by the computing system, a notification of termination of the first request to the first user.

6. The computer-implemented method of claim 1, further comprising:
    generating, by the computing system, a recommendation for modifying the first request based on the determination that the first request has exceeded the first usage threshold.

7. The computer-implemented method of claim 6, further comprising:
    applying, by the computing system, the recommendation to the first request to generate a modified first request; and
    automatically submitting, by the computing system, the modified first request for execution.

8. The computer-implemented method of claim 1, wherein the automatically terminating the first request further comprises:
    determining request identifying information associated with the first request;
    generating parameters based on the request identifying information; and
    invoking an automation with the parameters to terminate the first request, wherein the automation executes in parallel to the first request.

9. The computer-implemented method of claim 1, wherein the first usage threshold relates to cloud computing resource usage.

10. A system comprising:
at least one processor; and
a memory storing instructions that, when executed by the at least one processor, cause the system to:
receive request information associated with a first request, wherein the request information comprises user information associated with a first user;
determine a first usage threshold associated with the first user based on the user information;
determine that the first request has exceeded the first usage threshold;
automatically terminate the first request based on the determination that the first request has exceeded the first usage threshold;
receive a second request from a queue of uninitiated requests; and
automatically submit the second request for execution while the first request is automatically terminating.

11. The system of claim 10, wherein the first usage threshold is adjusted based on the determination that the first request has exceeded the first usage threshold.

12. The system of claim 10, wherein the first user is a member of a first group of users, and wherein the first group of users is associated with the first usage threshold.

13. The system of claim 12, wherein the instructions further cause the system to:
determine a second usage threshold associated with a second group of users; and
assign the first user to the second group of users, wherein the first usage threshold associated with the first user is adjusted to the second usage threshold.

14. The system of claim 10, wherein the instructions further cause the system to:
send a notification of termination of the first request to the first user.

15. A non-transitory computer-readable storage medium including instructions that, when executed by at least one processor of a computing system, cause the computing system to perform a method comprising:
receiving request information associated with a first request, wherein the request information comprises user information associated with a first user;
determining a first usage threshold associated with the first user based on the user information;
determining that the first request has exceeded the first usage threshold;
automatically terminating the first request based on the determination that the first request has exceeded the first usage threshold;
receiving a second request from a queue of uninitiated requests; and
automatically submitting the second request for execution while the first request is automatically terminating.

16. The non-transitory computer-readable storage medium of claim 15, wherein the first usage threshold is adjusted based on the determination that the first request has exceeded the first usage threshold.

17. The non-transitory computer-readable storage medium of claim 15, wherein the first user is a member of a first group of users, and wherein the first group of users is associated with the first usage threshold.

18. The non-transitory computer-readable storage medium of claim 17, wherein the instructions cause the computing system to further perform:
determining a second usage threshold associated with a second group of users; and
assigning the first user to the second group of users, wherein the first usage threshold associated with the first user is adjusted to the second usage threshold.

19. The non-transitory computer-readable storage medium of claim 15, wherein the instructions cause the computing system to further perform:
sending a notification of termination of the first request to the first user.

* * * * *